Feb. 7, 1928.
W. J. DONNELLY
CHOPPER AND SLICER
Filed Nov. 3, 1924
1,658,710
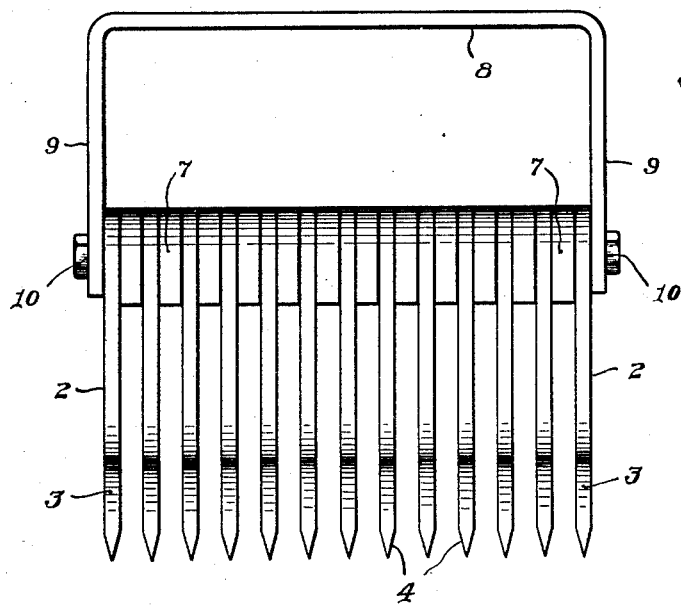
Fig. 1.
Fig. 4.
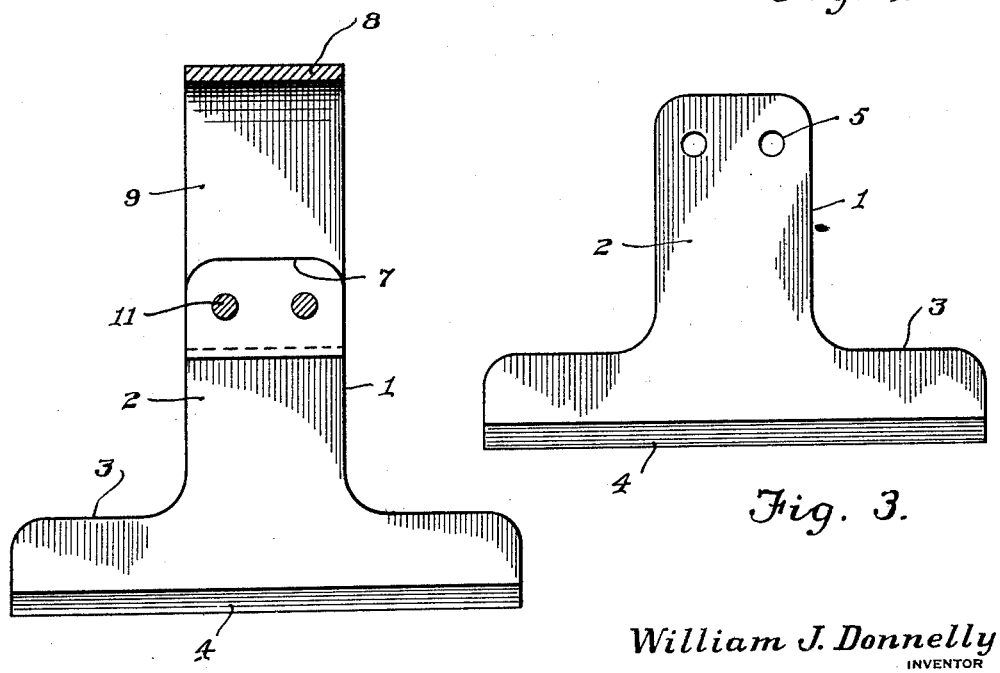
Fig. 2.
Fig. 3.
William J. Donnelly
INVENTOR
BY Victor J. Evans
ATTORNEY
WITNESS:

Patented Feb. 7, 1928.

1,658,710

UNITED STATES PATENT OFFICE.

WILLIAM J. DONNELLY, OF WISSAHICKON, PENNSYLVANIA.

CHOPPER AND SLICER.

Application filed November 3, 1924. Serial No. 747,626.

This invention relates to the general classification of culinary utensils, and more particularly to a chopper or slicer designed for use in the cutting of various vegetables or analogous edibles.

An object of the invention is to provide a cutter and slicer as specified, which is comparatively simple in construction, and may be manufactured at a very low cost, the entire structure being designed so that it may be made by a stamping out operation, to provide the various units which may be quickly and readily assembled.

Other objects of the invention will appear in the following detail description, and in the accompanying drawings wherein:

Figure 1 is a side elevation of the improved chopper and slicer.

Figure 2 is a vertical cross section through the improved chopper and slicer.

Figure 3 is a detail view of one of the cutting units embodied in the chopper and slicer.

Figure 4 is a detail view.

Referring more particularly to the drawings, the improved chopper and slicer comprises a plurality of cutting plates 1 each of which includes the upright attaching body 2 and the laterally projecting plate extensions 3 which preferably have their lower straight edges 4 sharpened to provide a cutting edge. The cutting blades which are substantially the shape of an inverted T and they are provided each with a pair of openings 5 and these openings align with the openings 6 in the spacing plates 7 one or more of which is positioned between each of the cutting blades 1, so as to properly space the cutting blades of any desired distance apart, depending upon the thickness of the slices or the coarseness of the material to be cut. The plates 7 are shaped to conform to the shape of the upper ends of the attaching portions 2 of the cutting blades 1 and in assembling the various units of the chopper and slicer, the handle 8 is used which is substantially the shape of an inverted U. The depending legs 9 of the handle are provided with openings 10 which align with the openings 5 and 6. Suitable bolts or clamping means are inserted through the aligning openings 5, 6 and 10, for securely clamping the various cutting blades 1 and spacers 7 in proper positions.

By loosening the bolts 11, and changing the relative positions of the spacer 7 and the cutting blades 1 the distances between the cutting blades may be varied as desired, at the will of the user, and depending upon the service to which the cutter or slicer is to be put.

It is obvious that the bolts 11 may be easily removed, allowing the entire structure of the chopper and slicer to be disassembled, permitting any one of the cutter blades to be removed and sharpened, or others inserted. It will be noted that the arms of the handle do not terminate into cutters. Furthermore the spacers 7 are arranged a substantial distance from the transverse chopper portions of the cutter blades, so that any food in being chopped will easily dislodge from between the shanks, and eventually fall back on the chopper board (not shown). It is well understood that choppers have heretofore been designed and used, and in view of which this invention is not subject to a broad interpretation. However, the inventor does claim a structure which is separable whereby the individual cutter plates may be removed for repairs or sharpening, or others inserted, and in addition to these features the food being chopped will not lodge between the cutter blades, as the spacers are arranged a substantial distance from the chopper portions of the cutter blades.

From the foregoing description taken in connection with the accompanying drawings, it will be apparent that the various units of the chopper or slicer structure may be stamped from metal, and readily and quickly assembled, thereby providing a spacer and slicer which may be manufactured at a low cost, as well as one which may be quickly and easily changed to vary the spaces between the cutting edges.

It is, of course, to be understood, that the invention may be constructed in various other manners and the parts associated in different relations, and therefore, I do not desire to be limited in any manner, except as set forth in the claim hereunto appended.

What I claim is:

As an article of manufacture, a separable chopper and slicer comprising a U-shaped handle, a plurality of spaced cutters comprising a substantially long cutting chopper portion and provided with shanks of substantial length intermediate the ends of the chopper portions, spacing members intermediate the ends of the shanks, thereby spacing the ends of the shanks between the arms of the U-shaped handle, the spacing members being a substantial distance from the substantially long chopper portions, and removable means passing through the arms of the handle and through the ends of the shanks and the spacing members, whereby the structure may be disassembled.

In testimony whereof I affix my signature.

WILLIAM J. DONNELLY.